April 21, 1942.  R. W. RUCKER ET AL  2,280,453

HARVESTER

Filed Dec. 17, 1940

INVENTORS
Robert W. Rucker & Clement R. Rucker
BY Williams, Rich & Morse
ATTORNEYS.

Patented Apr. 21, 1942

2,280,453

UNITED STATES PATENT OFFICE 2,280,453

HARVESTER

Robert W. Rucker and Clement R. Rucker, near Dalton City, Ill.

Application December 17, 1940, Serial No. 370,439

7 Claims. (Cl. 56—23)

This invention relates to harvesters adapted to be used in the harvesting of various crops among which wheat may be particularly mentioned.

A harvester such as that to which the present invention is directed employs essentially a horizontally disposed cutter, an elevator of the endless conveyor type, and a reel, the function of which is to insure such presentation of the grain to the cutter that the grain incident to its being severed will fall rearwardly onto the elevator in orderly fashion.

The type of harvester to which the present invention is particularly directed is ordinarily employed in conjunction with a thresher, the harvester and thresher constituting a portable harvester unit which, because of its weight, and for other reasons, is drawn by a tractor suitably coupled through the medium of a draw-bar to the unit relatively close to the front end thereof, the point of connection of the draw-bar with the tractor, on the one hand, and with said unit, on the other hand, being such that the unit travels along a path contiguous to the path of movement of the tractor.

In that type of harvester to which the present invention is particularly directed, the desirability of providing for vertical adjustment of the reel with respect to the cutter has heretofore been recognized and to that end such harvesters have been characterized (as shown, for example in Case Manual, fifth edition, J. I. Case Company, Racine, Wisconsin) by the fact that the reel-carrying arms have been pivotally supported so as to permit their outer or reel-carrying ends to be raised or lowered, the arms being normally maintained in various positions of adjustment by a pair of telescopic supports respectively associated therewith and each including means for locking the telescopic members thereof to each other in a more or less extended relationship as determined by the desired position of adjustment of the reel-carrying arms.

The carrying out of vertical reel adjustments in accordance with the prior art, particular reference being had to the disclosure of the above-mentioned Case Manual, has proved difficult because of the absence of means for facilitating the raising and lowering of the reel-carrying arms together with their associated reel. Such difficulty arises not merely because of the extreme weight of the reel-carrying arms and of their associated reel but also because of the fact that the telescopic supports are such that they, before initiating the reel adjustment, must be conditioned to free the reel-carrying arms for pivotal movement and must be thereafter so reconditioned as to lock their telescopic members together and thus enable them to support the combined weight of the reel and the reel-carrying arms.

Reel adjustments when provided for according to the prior art above cited, are open to objection on the ground that they are not only difficult to make but also are such that considerable time is required to make them. The time factor in this connection is of extreme importance as will be readily understood when it is taken into account that in the course of a relatively short run under actual harvesting conditions numerous reel adjustments, due to varying grain conditions, may be required and that each adjustment is, of necessity, attended by a complete cessation of the harvesting operation.

The foregoing objections to the prior art detract in no small measure from the merits of the present-day portable harvester unit designed as a time-saving instrumentality intended to promote efficiency and thus serve as a substantial contribution to agriculture.

Objects of the present invention are to facilitate the making of reel adjustments in harvesters of the type to which the present invention pertains and to obviate the necessity of discontinuing the harvesting operation to permit the making of such adjustments. To these ends the invention contemplates improved means, hereinafter more particularly described, whereby the objects sought may be definitely attained.

Other objects and advantages of the invention will become apparent from the following description when taken in connection with the accompanying drawing, which illustrates only so much of a harvester of the type to which the invention pertains as is necessary to a complete disclosure of the invention.

The type of harvester which is herein only fragmentally shown and to which the present invention is directed includes a header H, comprising a horizontally disposed cutter 10, rearwardly of which is provided an inclined elevator 11, on which the grain, incident to its being severed, falls rearwardly under the influence of a reel 12. The cutter 10, elevator 11 and reel 12 are, as will be readily understood by those skilled in the art, operated in a properly synchronized relation through the medium of suitable power actuated means, the cutter and the elevator being disposed intermediate a pair of suitable guard-like fenders 14—15 constituting elements of the header H.

Figure 1:
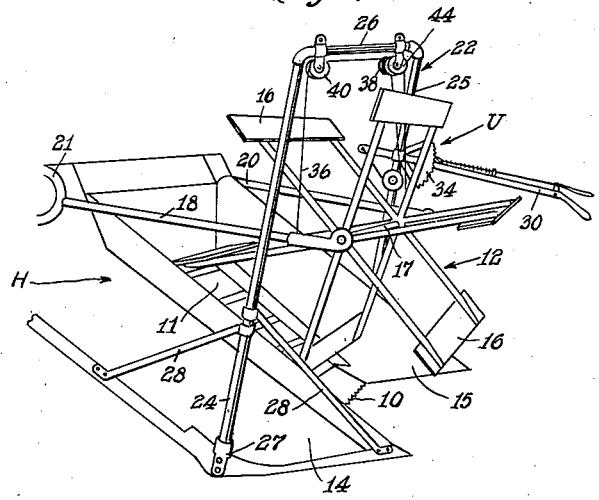
Fig. 1 is a fragmental perspective view of the front end of a harvester embodying the present invention.

The reel 12 is so arranged that its bats 16 sweep over the cutter 10 in a spaced relation thereto as the reel is rotated in a clockwise direction as viewed in Fig. 1, the reel being journalled, through the medium of its central shaft 17, to the front or vertically adjustable ends of a pair of reel-carrying arms 18—20, the rear ends of which are pivotally connected, as at 21, to opposite sides of the header H.

Inasmuch as the reel-carrying arms 18—20 are pivotally connected to the header H, it follows that by moving them in one direction or another about their points of pivotal connection various vertical adjustments of the reel 12 with respect to the cutter 10 may be effected to meet varying grain conditions which may be encountered from time to time.

The adjustability of these arms, as employed in the prior art and as hereinbefore pointed out, has been taken advantage of to effect vertical adjustments of the reel 12; but, as also hereinbefore explained, such reel adjustments have been not only difficult to make but of a pronounced time-consuming character. It is by the means now about to be described and hereinafter referred to as a reel-adjusting unit U that these objections to and difficulties arising from the prior art are overcome.

Figure 2:
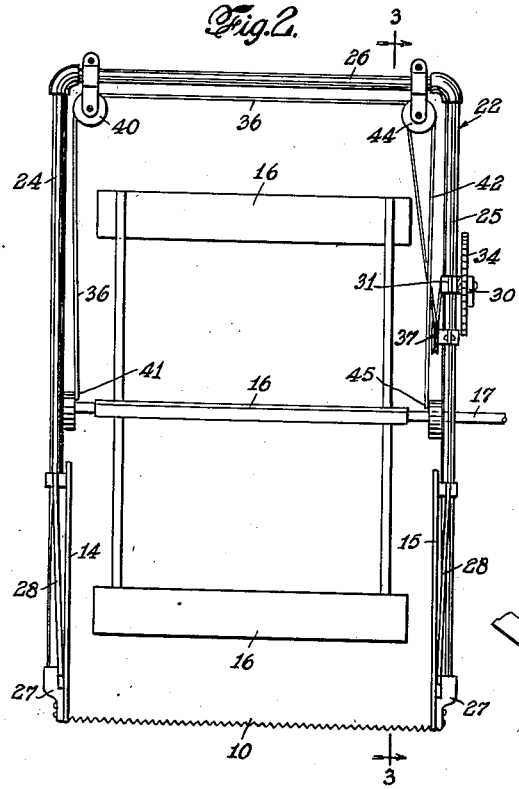
Fig. 2 is an end elevation of the harvester as viewed from the right in Fig. 1.
Figure 3:
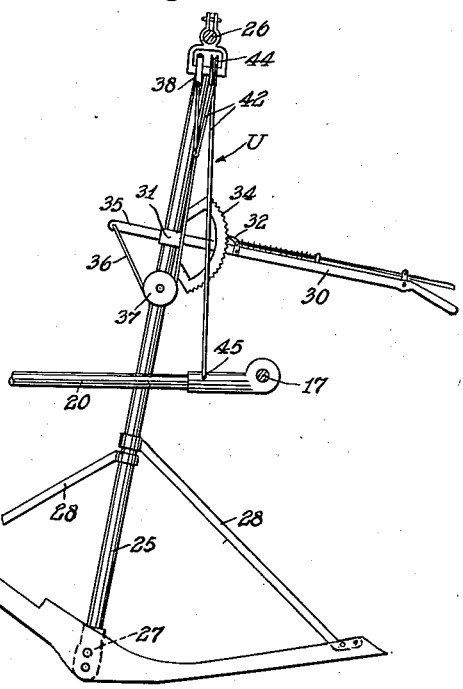
Fig. 3 is a vertical sectional view taken on line 3—3 of Fig. 2 and showing certain details of construction entering into the reel adjusting mechanism appearing in Figs. 1 and 2.

The reel-adjusting unit U comprises a yoke-like frame 22, which includes a pair of vertically disposed side frame members 24—25 connected together at their upper ends by a cross frame member 26. The side frame members 24—25 are suitably secured, as at 27, to the respective fenders 14—15 of the header H, any suitable means such as braces 28 being attached to the fenders and to the side frame members in order to reinforce or lend rigidity to the yoke-like frame 22. As shown most clearly in Fig. 2, the side frame members 24—25 are so spaced from each other as to accommodate therebetween the reel-carrying arms 18—20 and the reel 12, and are of such height as to provide sufficient space between the cross frame member 26 and the reel 12 to allow adequate vertical adjustment of the reel when grain conditions are such as to require extreme elevation of it in the interest of efficient operation. With regard to the side frame members 24—25, it will become apparent from an inspection of Fig. 2 that they, because of their proximity to the reel-carrying arms 18—20, effectively serve as guides for such arms and thus function to hold such arms against any undue lateral displacement tending to arise incident to vibrations set up in the harvester as a whole under actual operating conditions.

The reel-adjusting unit U further comprises an operating lever 30 which projects a substantial distance forwardly for the reason hereinafter more particularly stated. This lever is pivotally connected to the side frame member 25, as at 31, and is equipped with a hand-actuated dog 32 cooperating with a fixed toothed segment 34 in order that the lever may be locked against undue displacement from any one of its possible positions of adjustment. To the fulcrum-end 35 of the lever 30 there is anchored a cable 36 which passes under a grooved guide pulley 37 carried by the frame member 25. The cable 36 extends upwardly and thence over a pair of guide pulleys 38—40 suitably connected to the cross frame member 26, the cable being in turn connected, as at 41, to the reel-carrying arm 18 relatively near its outer end. At a point intermediate the pulleys 37 and 38, the cable 36 is connected to a branch cable 42 which extends upwardly and thence over a pulley 44 suitably connected to the cross frame member 26, the branch cable being in turn connected, as at 45, to the reel-carrying arm 20 relatively near its outer end.

From the foregoing description of the reel-adjusting unit U, it will be readily appreciated that the reel-carrying arms 18 and 20, together with their associated reel 12, may, through the medium of the lever 30 and its associated pulley and cable system, be easily and quickly elevated to any one of its many possible positions of adjustment. The lowering of the reel-carrying arms 18—20 and their associated reel 12 to any position of adjustment may be effected with equal ease and rapidity by releasing the lever 30 and permitting the adjustment to be carried out under the action of the weight of the reel-carrying arms and their associated reel.

The harvester to which the present invention is particularly directed is, as hereinbefore stated, of the type designed to be drawn by a tractor operating along a path contiguous to the path followed by the header H, the draw-bar connection (not shown) between the harvester and tractor being such that the tractor follows a course to the left of the path traversed by the harvester with the result that the operating lever 30 is at all times within easy reach of the tractor operator so that he may readily take such steps as are necessary to so move that lever as to effect in quick order any adjustment of the reel that may become necessary to meet a particular grain condition as it is encountered.

Although only one form of the invention is herein shown and described, it will be understood that various changes may be resorted to without departing from the spirit of the invention or the scope of the following claims.

What is claimed is:

1. A harvester of the type adapted to be drawn by a tractor, comprising a header including a cutter; a reel adapted for rotation above said cutter in a spaced relation thereto; a pair of reel-carrying arms pivotally connected to said header and with which said reel is associated; side frame members attached to and extending upwardly from said header beyond said reel-carrying arms, said side frame members being disposed in close proximity to said reel-carrying arms and serving to hold said reel-carrying arms against lateral displacement; a lever pivotally connected to one of said side frame members and extending forwardly with relation to said header; and actuating connections cooperatively connecting said lever to said reel-carrying arms and operating in response to movement of said lever to effect corresponding movement of said reel-carrying arms whereby vertical adjustment of said reel with relation to said cutter is effected.

2. A harvester of the type adapted to be drawn by a tractor, comprising a header including a cutter; a reel adapted for rotation above said cutter in a spaced relation thereto; a pair of reel-carrying arms pivotally connected to said header and with which said reel is associated; a yoke-like frame including side frame members attached at their lower ends to said header and extending upwardly above said reel and a cross frame member connected to said side frame members above and in a spaced relation to said reel, said side frame members being disposed in close proximity to said reel-carrying arms and serving to hold said reel-carrying arms against lateral displacement; a lever pivotally connected to one of said side frame members and extending forwardly with relation to said header; and a pulley and cable system cooperatively connecting said lever to said reel-carrying arms and operating in response to movement of said lever to effect corresponding movement of said reel-carrying arms whereby vertical adjustment of said reel with relation to said cutter is effected.

3. A harvester of the type adapted to be drawn by a tractor, comprising a header including a cutter; a reel adapted for rotation above said cutter in a spaced relation thereto; a pair of reel-carrying arms pivotally connected to said header and on which said reel is rotatably mounted; side frame members attached to said header and between which said reel-carrying arms and said reel are accommodated, said side frame members being disposed in guiding relation to said reel-carrying arms and serving to hold said reel-carrying arms against lateral displacement; a lever pivotally supported with relation to said frame members; and actuating connections cooperatively connecting said lever to said reel-carrying arms and operating in response to movement of said lever to effect corresponding movement of said reel-carrying arms whereby vertical adjustment of said reel with relation to said cutter is effected.

4. A harvester of the type adapted to be drawn by a tractor, comprising a header including a cutter; a reel adapted for rotation above said cutter in a spaced relation thereto; a pair of reel-carrying arms pivotally connected to said header and on which said reel is rotatably mounted; side frame members attached to said header, said frame members being disposed in guiding relation to said reel-carrying arms and serving to hold said reel-carrying arms against lateral displacement; a lever pivotally supported with relation to said frame members; and actuating connections cooperatively connecting said lever to said reel-carrying arms and operating in response to movement of said lever to effect corresponding movement of said reel-carrying arms whereby vertical adjustment of said reel with relation to said cutter is effected.

5. A harvester of the type adapted to be drawn by a tractor, comprising a header including a cutter; a reel-carrying unit having a pivotal connection with said header and extending forwardly of such connection to a point above said cutter; a reel rotatably supported on the forward end of said unit in spaced relation to said cutter and disposed on an axis substantially directly above and parallel to said cutter; a lever pivotally supported with relation to said header; and actuating connections cooperatively connecting said lever to said reel-carrying unit in the immediate vicinity of said axis and operating in response to movement of said lever to effect corresponding movement of said reel-carrying unit whereby vertical adjustment of said reel with relation to said cutter is effected.

6. A harvester of the type adapted to be drawn by a tractor, comprising a header including a cutter; a reel-carrying unit having a pivotal connection with said header and extending forwardly of such connection to a point above said cutter; a reel rotatably supported on the forward end of said unit in spaced relation to said cutter and disposed on an axis substantially directly above and parallel to said cutter; a reel-carrying-unit guide attached to said header and extending upwardly therefrom beyond and in close proximity to said unit, a lever pivotally supported with relation to said header; and actuating connections cooperatively connecting said lever to said reel-carrying unit in the immediate vicinity of said axis and operating in response to movement of said lever to effect corresponding movement of said reel-carrying unit whereby vertical adjustment of said reel with relation to said cutter is effected.

7. A harvester of the type adapted to be drawn by a tractor, comprising a header including a cutter; a reel-carrying unit having a pivotal connection with said header and extending forwardly of such connection to a point above said cutter; a reel rotatably supported on the forward end of said unit in spaced relation to said cutter and disposed on an axis substantially directly above and parallel to said cutter; a reel-carrying-unit guide attached to said header and extending upwardly therefrom beyond and in close proximity to said unit; a lever pivotally supported with relation to said header; and actuating connections cooperatively connecting said lever to said reel-carrying unit at opposite ends of said reel and in the immediate vicinity of said axis and operating in response to movement of said lever to effect corresponding movement of said reel-carrying-unit whereby vertical adjustment of said reel with relation to said cutter is effected.

ROBERT W. RUCKER.
CLEMENT R. RUCKER.